Jan. 16, 1968   P. E. HOTCHKISS   3,363,735
ROLLER
Filed March 16, 1966

INVENTOR.
PHILLIP E. HOTCHKISS
BY
George A. Sullivan
Agent

United States Patent Office 3,363,735
Patented Jan. 16, 1968

3,363,735
ROLLER
Philip E. Hotchkiss, Castile, N.Y., assignor to Lockheed
Aircraft Corporation, Burbank, Calif.
Filed Mar. 16, 1966, Ser. No. 534,715
3 Claims. (Cl. 137—37)

ABSTRACT OF THE DISCLOSURE

A mechanical device is provided which performs the basic functions of a cargo roller, namely, rotating on and about an axle mounted perpendicular to the direction of motion of the objects which will pass over the roller. The roller in turn is made up of a series of small rollers equally spaced radially about the center of rotation of the basic roller. The outer surfaces of the small rollers are contoured in such a manner that they make up the outer surface of the basic roller as well, and are so spaced that a slight overlap occurs between adjacent banks of small rollers, thus providing a continuous diameter for the basic roller. Since the outer surface of the small rollers is indexed perpendicular to the basic roller axis, any object rolling over the basic roller can also move from side to side with or without rotation of the basic roller.

---

This invention relates to rollers such as those employed on conveyors to facilitate the movement of objects thereon and more particularly to such a roller capable of permitting unrestricted lateral as well as longitudinal displacement of the object, i.e., substantially universal movement.

The present invention has in view a roller of improved weight to strength ratio making it particularly suited for use on cargo aircraft as an onboard installation in the floor of the ramp to the storage compartment thereof. Omnidirectional rollers are highly desirable on such ramps in that they expedite the cargo loading operation by eliminating the need to precisely align the cargo with the storage compartment prior to and while it is being rolled over the ramp.

At the same time such a roller is required to be of rugged design and construction in order to withstand the abuse to which it is normally subjected and still remain reliable in its operation. This includes its ability to rotate freely and without restriction in the multiple directions for which it is designed.

The roller herein proposed satisfies the foregoing as well as other requirements and conditions by the provision of a load-supporting surface that is freely rotatable in multiple directions angular to each other to enable objects rolling over it to be moved either concurrently or independently sideways and/or fore and aft. Moreover, this load-supporting surface is such as to establish and maintain continuous and unbroken contact with the object moving over it regardless of direction and to ensure the smooth and rapid conveyance thereof.

More specifically, the present roller is provided with a peripheral surface that is established by multiple, rotatably mounted supplemental rollers the axes of rotation of which are disposed in at least two transverse planes with reference to the axis of rotation of the principal roller. The supplemental rollers disposed in each plane are radially displaced from those of the next adjacent plane and the surfaces of all of these supplemental rollers are so contoured that they coact with each other to form an unbroken peripheral surface about the axis of rotation of the principal roller.

Figure 2:
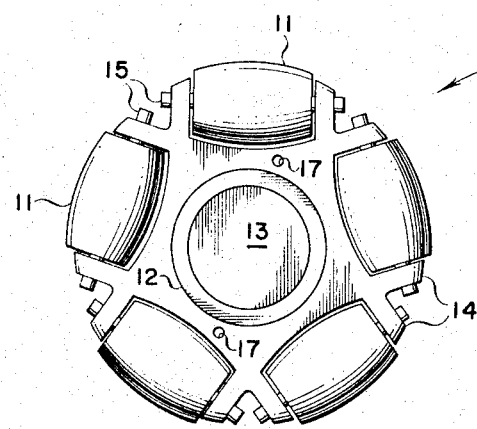
Figure 1:
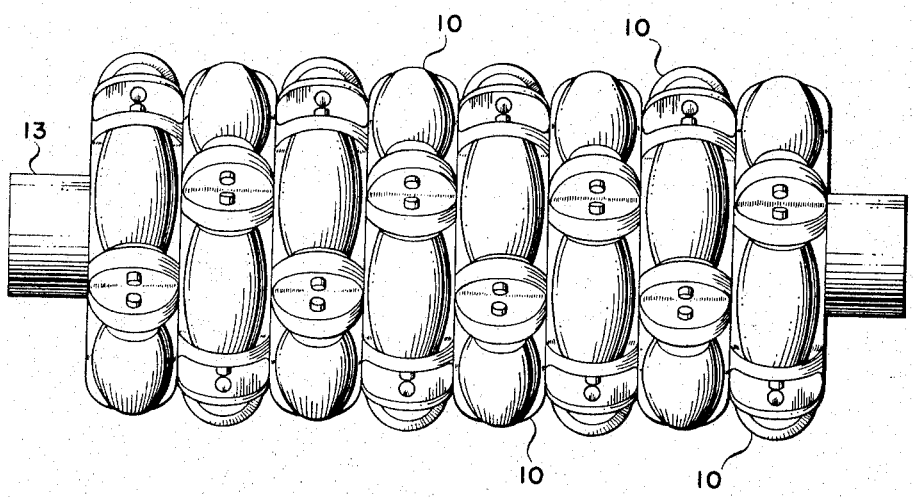
Figure 3:
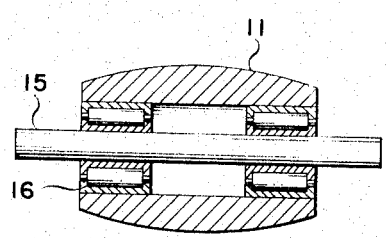

The above and other objects of the invention will become more apparent with the further and more specific disclosure that follows and in which the construction, combination and arrangement of parts are all more fully described, claimed and illustrated in the accompanying drawings wherein:

FIGURE 1 is a side elevation of a roller constructed in accordance with the teachings hereof to show primarily the multiple supplemental rollers, in this case barrels, disposed with their axes of rotation in eight parallel planes at right angles to the axis of rotation of the principal roller and the individual mounting thereof for independent rotation;

FIGURE 2 is an end elevation of the roller illustrated in FIGURE 1 to show primarily the contour of each barrel surface whereby it forms an arc of a circle having a center at the axis of rotation of the principal roller and the several barrels, in this case five in each parallel plane, coact to establish the peripheral surface of the principal roller; and FIGURE 3 is a longitudinal section taken through one of the supplemental rollers or barrels to show primarily the mounting thereof for free and unrestricted rotation.

Referring with greater particularity to the drawings 10 designates one segment of a roller as herein proposed which comprises at least two such segments disposed in relatively fixed parallel planes. Each of these segments is made up of five identical barrels 11 equally spaced radially about the center of rotation of a support bearing 12. The bearing 12 is adapted to be mounted following conventional practice on an axle 13 for free and unrestricted rotation and terminates peripherally in five pairs of spaced arms 14 that extend in a generally radial direction. Each pair of arms 14 is pierced transversely to receive and mount the opposite ends of a spindle 15 on which a barrel 11 is rotatably mounted for example on a needle bearing 16.

The shape or curvature of the external surface of each barrel 11 in the longitudinal direction, i.e., the plane of its spindle 15, is such that it forms an arc of a circle about the axle 13. The several arms 14 all terminate short of the circle thus defined so that when adjacent roller segments 10 are oriented so that the barrel 11 of each segment falls between the barrel or barrels 11 of each adjacent segment a radially continuous and unbroken surface is established. In order to accomplish this, the length of each barrel 11 must be such as to ensure a circumferential overlap of the barrels 11 on adjacent segments. The circular surface thus established constitutes the load-supporting and conveying surface of the roller.

At the same time the several individual barrels 11 each independently mounted for free and unrestricted rotation at right angles to the axle 13 establish a longitudinal surface which for all intents and purposes is cylindrical. Thus, regardless of the position of the roller, i.e., the angularity of the circular surface, it is in intimate contact at all times with the object it conveys.

In order to maintain successive roller segments 10 in the desired radial position as described, one or more pins 17 may be employed. Such pins 17 pierce adjacent segments 10 transversely, being pressfitted or otherwise secured thereto through holes provided therefor. Thus connected, the dual segments 10 form in effect an integral unit and any number of dual segments 10 may be combined to produce a roller of the desired length.

It is to be understood that the foregoing disclosure is directed to a preferred embodiment of the invention. As will be apparent to those skilled in the art, various changes and modifications may be made in this embodiment without departing from the invention, the true spirit and scope of which is set forth in the appended claims.

What is claimed is:
1. A roller assembly comprising a main cylindrical roller formed by multiple supplemental rollers each rotatably mounted on a spindle with the axes of rotation of the several supplemental rollers disposed in a plurality of transverse planes with reference to the axis of rotation of the main roller and the supplemental rollers of each such plane radially displaced from those of each adjacent plane, the surfaces of all said supplemental rollers being contoured whereby to coact with each other and form a substantially unbroken peripheral surface constituting the external surface aforesaid, an axle, and a bearing mounting said main cylindrical roller for free and unrestricted rotation on said axle, said bearing being coextensive in length with said main roller and in surface to surface contact at and continuously along its entire length with said axle with each supplemental roller spindle aforesaid being mounted peripherally thereon.

2. The roller of claim 1 wherein said supplemental rollers are identical barrels each having an external longitudinal surface that is an arc of a circle having a center at the axis of rotation of said main roller and the barrels in each plane are of a preselected length and spaced one from the other a distance less than said length whereby the barrels of successive planes when radially displaced as aforesaid are disposed with their adjacent longitudinal surfaces in overlapped relation.

3. The invention of claim 2 wherein said bearing includes a common support individual to said supplemental rollers in the same transverse plane having a transverse dimension greater than said supplemental rollers and formed with multiple pairs of spaced arms extending in a generally radial direction relative to said axle with a spindle between each said pair of arms adapted to rotatably mount one of said barrels, and a connector between adjacent supports to maintain them radially displaced as aforesaid.

References Cited
UNITED STATES PATENTS

| | | | |
|---|---|---|---|
| 1,123,851 | 1/1915 | Cooper | 193—37 |
| 2,858,000 | 10/1958 | Ohnstad | 193—35 |
| 2,873,021 | 2/1959 | McWhorter | 198—109 |
| 3,016,127 | 1/1962 | Cooper | 198—184 |
| 3,295,700 | 1/1967 | Ziegler | 214—1 |

ANDRES H. NIELSEN, *Primary Examiner.*